US006804532B1

(12) United States Patent
Moon et al.

(10) Patent No.: US 6,804,532 B1
(45) Date of Patent: Oct. 12, 2004

(54) SYSTEM AND METHOD FOR RE-ROUTING COMMUNICATIONS BASED ON WIRELESS COMMUNICATION LINK QUALITY

(75) Inventors: Billy G. Moon, Morrisville, NC (US); Malcolm M. Smith, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 515 days.

(21) Appl. No.: 09/746,430

(22) Filed: Dec. 22, 2000

(51) Int. Cl.[7] .................................................. H04B 1/38
(52) U.S. Cl. ................. 455/552.1; 455/445; 455/553.1; 455/426.1; 455/67.11; 455/67.14; 370/328; 370/332; 370/333; 370/338; 370/252
(58) Field of Search .............................. 455/445, 552.1, 455/553.1, 426.1, 67.11, 67.14; 370/328, 332, 333, 338, 252, 238, 238.1, 400

(56) References Cited

U.S. PATENT DOCUMENTS

| | | | |
|---|---|---|---|
| 5,457,680 A | 10/1995 | Kamm et al. ................. 370/17 |
| 5,479,479 A | 12/1995 | Braitberg et al. ............. 379/58 |
| 5,590,126 A | * 12/1996 | Mishra et al. ............... 370/329 |
| 5,657,375 A | 8/1997 | Connolly et al. ........... 455/436 |
| 5,697,055 A | * 12/1997 | Gilhousen et al. .......... 455/436 |
| 5,974,036 A | 10/1999 | Acharya et al. ............. 370/331 |
| 5,987,011 A | 11/1999 | Toh ............................ 370/331 |
| 6,243,585 B1 | 6/2001 | Pelech et al. ................ 455/449 |
| 6,363,260 B1 | * 3/2002 | Achour et al. ........... 455/553.1 |
| 6,418,324 B1 | * 7/2002 | Doviak et al. ............ 455/426.1 |
| 6,603,966 B1 | 8/2003 | Sheffield ..................... 455/423 |
| 6,614,784 B1 | 9/2003 | Glitho et al. ............... 370/352 |
| 6,636,589 B2 | 10/2003 | Escobar Gonzales et al. ..................... 379/112.09 |
| 2003/0013482 A1 | * 1/2003 | Brankovic .................. 455/553 |
| 2003/0017842 A1 | * 1/2003 | Moles et al. ................ 455/552 |
| 2003/0119550 A1 | * 6/2003 | Rinne et al. ................ 455/553 |

OTHER PUBLICATIONS

Intel, "IBM Push for Public Wireless LAN," Computerworld Website, 4 pages, Jul. 22, 2002.
PADCO, "TotalRoam®—Work in Motion," Totalroam Website, 3 pages, Oct. 25, 2003.

* cited by examiner

Primary Examiner—Vivian Chin
Assistant Examiner—Minh D. Dao
(74) Attorney, Agent, or Firm—Baker Botts L.L.P.

(57) ABSTRACT

A method for re-routing communications based on link quality includes establishing a first wireless communication link with a mobile station. The first wireless communication link is included in a first communication path used for communications between the mobile station and a destination device. The method also includes monitoring, from the mobile station, the link quality of the first wireless link and determining, at the mobile station, that the link quality of the first communication link has decreased below a low link quality threshold. The method further includes routing, using a router at the mobile station, communications between the mobile station and the destination device to a second communication path that includes a second wireless communication link to the mobile station. The second communication path is selected by the router based on one or more metrics.

37 Claims, 3 Drawing Sheets

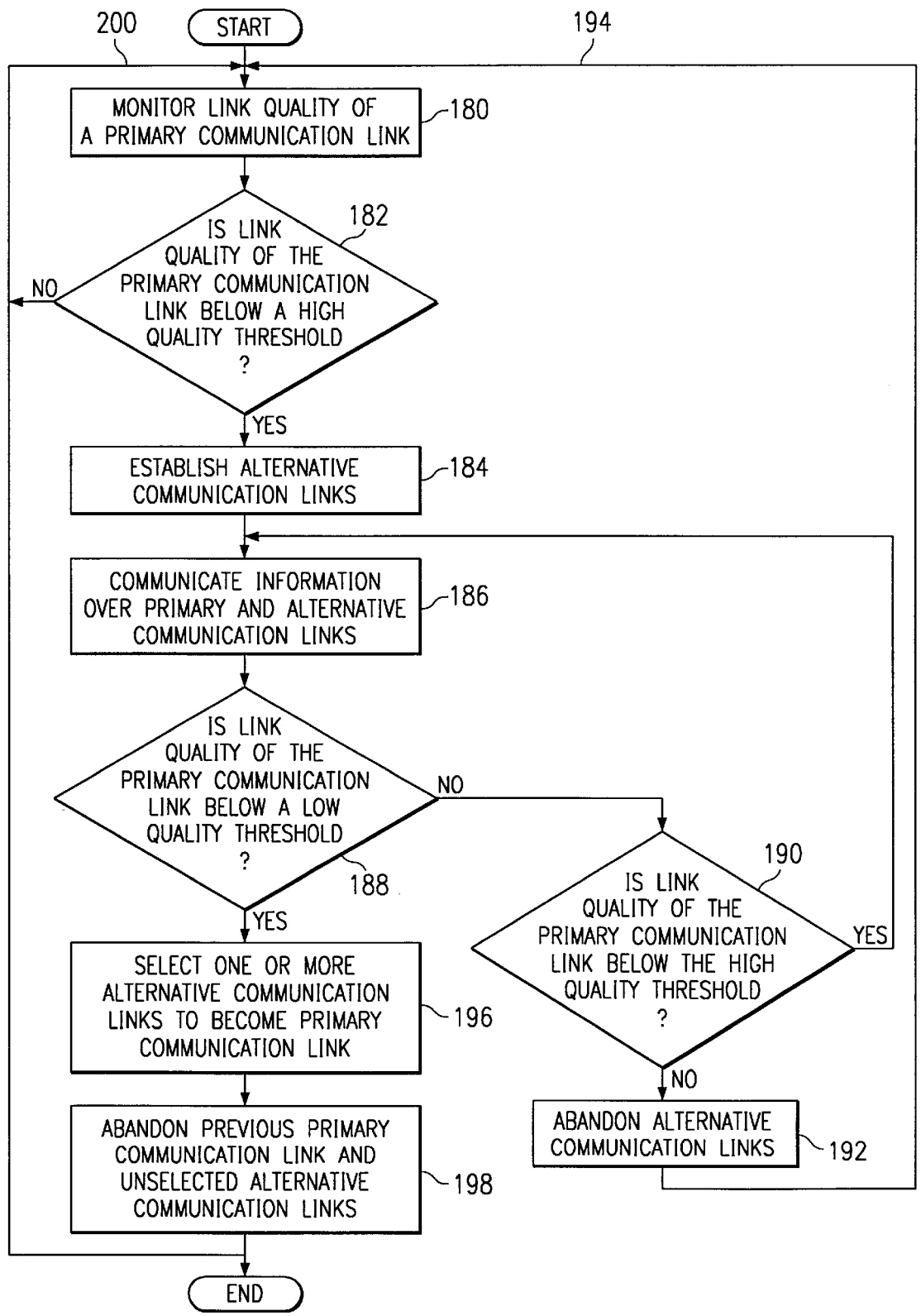

SYSTEM AND METHOD FOR RE-ROUTING COMMUNICATIONS BASED ON WIRELESS COMMUNICATION LINK QUALITY

CROSS-REFERENCE TO RELATED APPLICATION

This application is filed concurrently with the commonly-owned application Ser. No. 09/746,207 entitled SYSTEM AND METHOD FOR ROUTING COMMUNICATIONS BASED ON WIRELESS COMMUNICATION LINK QUALITY.

TECHNICAL FIELD OF THE INVENTION

This invention relates to the field of communications, and more particularly to a system and method for routing communications based on wireless communication link quality.

BACKGROUND OF THE INVENTION

In a typical cellular telephone system, mobile stations (for example, cellular telephones) communicate with base stations using wireless communication links. The base stations are coupled to a base station controller, which is coupled to a mobile switching center. Communications from the mobile station are sent to the base station controller. The base station controller may forward the communications to another mobile station using the same or another base station in the cellular network. Alternatively, the base station controller may forward the communications to the mobile switching center for communication to another network, such as another cellular network, the public switched telephone network, the Internet, or any other appropriate networks.

As a mobile station moves away from a base station, the ability of the mobile station to communication with the base station may be impaired. However, as this impairment of communications occurs, other base stations in the same cellular network may come within range of the mobile station. Therefore, the responsibility for supporting communications with the mobile station may be transferred from one base station to another. This transfer of responsibility (or "handoff") is typically controlled by the mobile switching center and/or the base station controller, not by the mobile station. Handoffs within a single cellular network are typical and may often be performed with minimal effect on communications with the mobile station. However, a handoff between base stations in different cellular networks, when available, is more complicated and often has a detrimental effect on communications with the mobile station.

Furthermore, mobile stations are increasingly being outfitted with additional communication interfaces to allow the mobile station to communicate with other types of networks and stand-alone devices. As with handoffs between different types of cellular networks, handoffs of communications between these different technologies is also difficult or unavailable.

SUMMARY OF THE INVENTION

According to the present invention, disadvantages and problems associated with previous routing systems and methods have been substantially reduced or eliminated.

According to one embodiment of the present invention, a method for re-routing communications based on link quality includes establishing a first wireless communication link with a mobile station. The first wireless communication link is included in a first communication path used for communications between the mobile station and a destination device. The method also includes monitoring, from the mobile station, the link quality of the first wireless link and determining, at the mobile station, that the link quality of the first communication link has decreased below a low link quality threshold. The method further includes routing, using a router at the mobile station, communications between the mobile station and the destination device to a second communication path that includes a second wireless communication link to the mobile station. The second communication path is selected by the router based on one or more metrics.

The system and method of the present invention provide a number of important technical advantages. Unlike devices having a fixed location, the availability and quality of communication links, typically wireless communication links, with a mobile station may vary. Embodiments of the present invention account for the effect of this changing environment when routing communications to and from the mobile station. Certain embodiments of the present invention also provide transparent "re-routing" of communications by the mobile station from one communication link to another as the link quality of a communication link being used decreases and as other communication links become available. Furthermore, such transparent re-routing or "handoff" is provided between diverse communication networks and technologies. Other important technical advantages are readily apparent to those skilled in the art from the following figures, descriptions and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 5 illustrates an exemplary method for re-routing communications based on link quality.

DETAILED DESCRIPTION OF THE INVENTION

Figure 1:
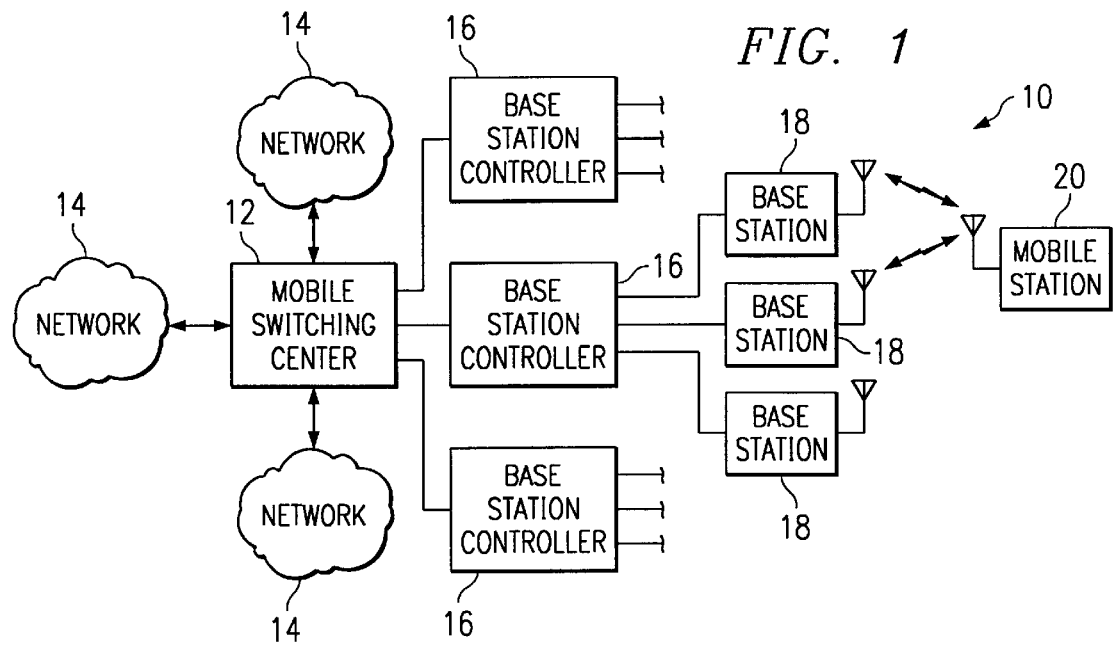
FIG. 1 illustrates an exemplary cellular communication system.

FIG. 1 illustrates an exemplary cellular communication system 10 that includes a mobile switching center (MSC) 12 coupled to a communication network 14 and one or more base station controllers (BSCs) 16. MSC 12 is also typically referred to as a mobile telephone exchange (MTX) or a mobile telephone switching office (MTSO), depending on the type of cellular technology being used. Controllers 16 are coupled to one or more base stations 18, which provide wireless communication services for one or more mobile stations 20. Each base station 18 may handle wireless communications with mobile stations 20 located in a particular geographical area (typically referred to as a "cell"). In general, a mobile station 20 establishes a wireless communication link with the particular base station 18 that handles wireless communications in the area in which mobile station 20 is located. The wireless communication link is then used to support communications between mobile station 20 and another device.

Mobile stations 20 may communicate with base stations 18 using any suitable wireless communication protocols. Such wireless communication protocols may include, but are not limited to, Time Division Multiple Access (TDMA), Frequency Division Multiple Access (FDMA), Code Division Multiple Access (CDMA), and their subsets and variants. Mobile stations 20 may be analog or digital cellular telephones, personal digital assistants (PDAs), laptop computers, pagers, or other suitable wireless devices providing voice, video, data, and other wireless services to users. Base stations 18 include any hardware and/or software that supports wireless communication links with mobile stations 20 using any suitable packet-based or circuit-switched, wireless communications protocols. Base stations 18 may include radio transmission and reception devices and antennas used to establish and maintain communication sessions with multiple mobile stations 20.

Controllers 16 manage radio resources for one or more base stations 18. For example, a controller 16 may manage radio channel setup, frequency hopping, handoffs, and other suitable functions for base stations 18. In addition, controllers 16 are used to couple base stations 18 to MSC 12. Alternatively, base stations 18 maybe directly connected to MSC 12, and MSC 12 may perform all the functions of controllers 16 described above.

MSC 12 operates as a switching node for cellular system 10. In addition, MSC 12 supports mobile stations 20 by providing functions such as registration, authentication, location updating, handoffs, and call routing to roaming mobile stations 20. MSC 12 is coupled to one or more networks 14 so as to provide access to other communication devices that are coupled to network 14. MSC 12 may translate between wireless protocols used for communications with mobile stations 20 and protocols used for communications with other devices coupled to network 14. Network 14 represents any collection and arrangement of hardware and/or software supporting communications between multiple devices. For example, network 14 may include one or more components associated with the PSTN, a local area network (LAN), a wide area network (WAN) (such as an Internet Protocol (IP) network, an asynchronous transfer mode (ATM) network or a cable data network), a global computer network such as the Internet, or other suitable wireline or wireless communications technology that supports communications between multiple devices. For example, MSC 12 may establish a connection between mobile station 20 and a telephone coupled to the PSTN or with a computer coupled to the Internet. Using MSC 12, connections may be established with numerous other types of stand-alone devices and networks.

As mobile station 20 moves away from a particular base station 18, the ability of mobile station 20 to communicate with base station 18 is degraded. Furthermore, other factors, such as the number of mobile stations 20 communicating with base station 18, atmospheric conditions, and terrain features, may also degrade the communication link between mobile station 20 and base station 18. In an ideal cellular system, base stations 18 are located such that mobile station 20 is always within communication range of at least one base station 18. As mobile station 20 moves away from a base station 18, mobile station 20 typically moves within range of another base station 18. When mobile station is within range of two base stations 18, MSC 12 and/or controller 16 may determine which base station 18 has responsibility for supporting communications to and from mobile station 20 (for example, based on the signal strength from base stations 18). As the signal strength from one base station 18 fades, MSC 12 and/or controller 16 may initiate the transition of responsibility for communication with mobile station 20 from the base station 18 to another base station 18 in cellular system 10. This transition is typically referred to as a "handoff."

In a TDMA network, handoffs are performed by switching the carrier frequency and/or time slot used for communication between mobile station 20 and the controlling base station 18. Therefore, communications between mobile station 20 and base station 18 are placed on a new carrier wave during a handoff. This is typically referred to as a "hard handoff" since mobile station 20 may only have one radio frequency (RF) transceiver for a particular network and the RF transceiver must switch from one frequency to another to accomplish a handoff. In CDMA, on the other hand, all mobile stations 20 communicate using a single carrier frequency. Although mobile stations 20 still typically have a single RF transceiver, the RF transceiver picks up all of the signals from base stations 18 which are within range of mobile station 20 since all the base stations 18 operate on the same frequency. When mobile station 20 moves within range of multiple base stations 18 (for example, when mobile station 20 moves between cells), MSC 12 and/or controller 16 may initiate simultaneous communication between multiple base stations 18 and mobile station 20. MSC 12 and/or controller 16 may evaluate the signal received from mobile station 20 at the various base stations 18 and determines which signal is the best to use at any particular moment in time. This process is typically referred to as a "soft handoff" since MSC 12 and/or controller 16 can make a "soft" decision about which base station 18 to use and do not have to limit communications to one base station 18 at a time.

Although TDMA and FDMA handoffs may not always be as seamless as CDMA handoffs, all of the intra-technology or "homogeneous" handoffs (handoffs between base stations 18 in the same cellular system) typically involve little or no degradation in communications with mobile station 20. However, inter-technology or heterogeneous handoffs (for example, CDMA-to-FDMA or TDMA-to-FDMA handoffs) are more complicated and typically result in a noticeable degradation or interruption in communications. This degradation or interruption is due to the difference in technology and equipment used in the various types of cellular networks. For example, different cellular networks will have different MSCs 12, controllers 16, and base stations 18 using different signaling and communication techniques.

As an example only, for a mobile station 20 to communicate on both a CDMA and a FDMA network, mobile station 20 will include a transceiver for each network and a handoff between the networks will involve switching between the two transceivers as well as between two different types of base stations 18 controlled by different MSCs 12. The CDMA MSC 12 and/or controller 16 determines when CDMA coverage is no longer available and informs mobile station 20 when mobile station 20 needs to use FDMA coverage. Mobile station 20 then has to begin communication with the FDMA network and control of a call or other ongoing communication session with mobile station 20 has to be switched from the CDMA network to the FDMA network. Furthermore, when the communication session has been transferred to the FDMA network, the FDMA network typically cannot transfer the communication session back to the CDMA network. As is described, the problems associated with heterogeneous handoffs may be reduced by placing control of such handoffs (and other routing of communications) in mobile station 20.

Figure 2:
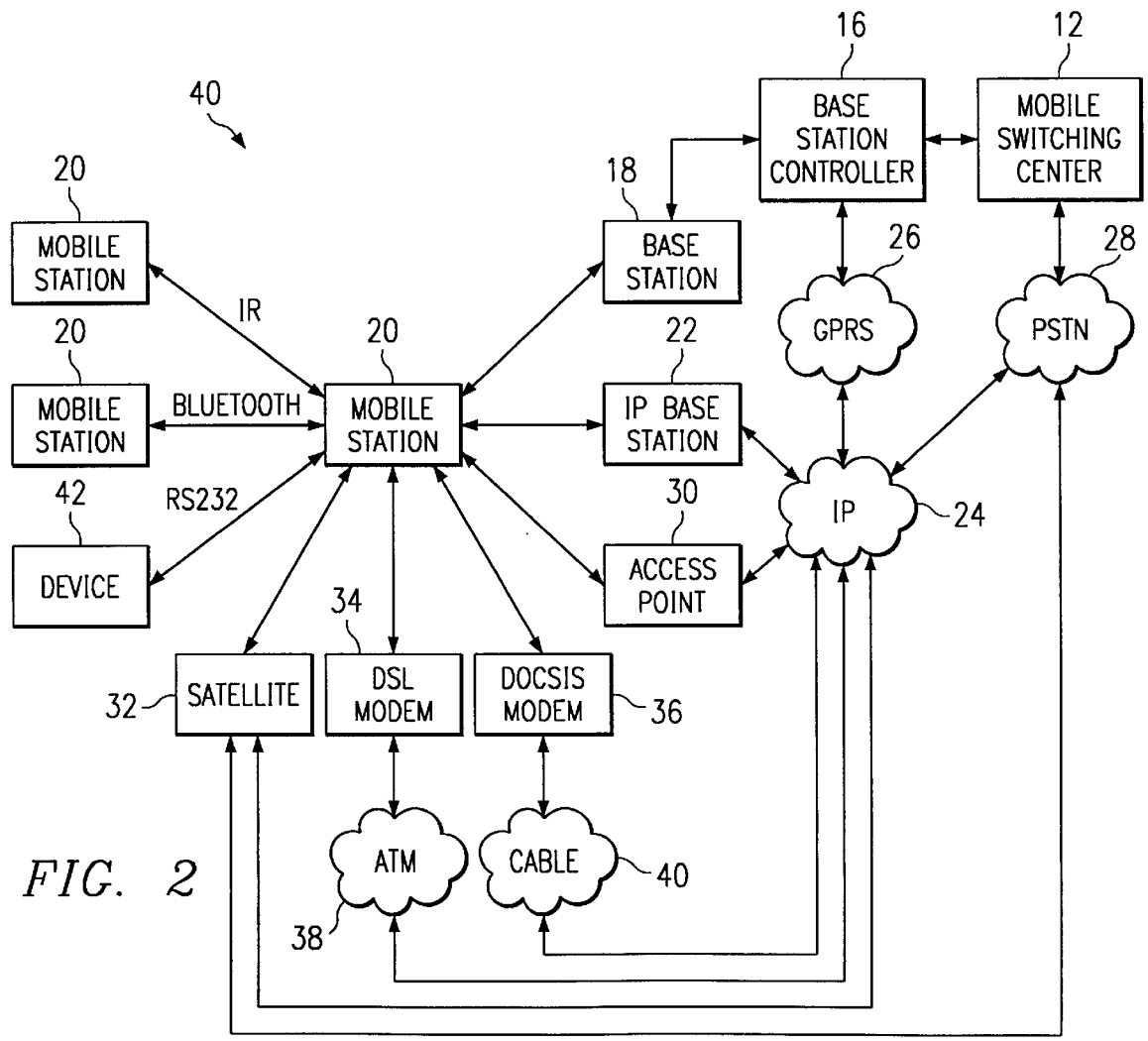
FIG. 2 illustrates an exemplary communication system including a mobile station coupled to various communication networks and stand-alone devices using wireless and wireline communication links.

FIG. 2 illustrates an exemplary communication system 40 including a mobile station 20 coupled to various communication networks and stand-alone devices using wireless and wireline communication links. In addition to communication between mobile station 20 and cellular communication system 10, as described above, mobile station 20 may also communicate with various other wireless devices and/or networks. For example, mobile station 20 may communicate with an IP base station 22 that is coupled to an IP network 24 (for example, an IP LAN, an IP WAN, or the Internet). IP base station 22 provides for packet-based communication with mobile station 20. If a mobile station 20 in communication with a regular base station 18 wishes to communicate with an IP network such as the Internet using the base station 18, data communicated from mobile station 20 to IP network 24 is typically communicated through controller 16, MSC 12, and one or more other networks coupling MSC 12 to IP network 24. For example, MSC 12 may be coupled to IP network 24 using the PSTN 28. In such a case, the format of the communicated data and the signaling associated with the data typically needs to be converted or translated as the data and signaling are communicated from one network or stand-alone device to the next IP base station 22 eliminates the need for this conversion or translation since IP base station 22 receives data in an IP format and communicates the data in the IP format to IP network 24. Alternatively, controller 16 may be coupled to IP network 24 using a General Radio Packet Service (GPRS) network 26. GPRS 26 is an alternative method for communicating data packets to IP network 24 without using MSC 12 and its associated disadvantages.

The use of both IP base stations 22 and GPRS networks 26 represent a trend towards the use of packet-based communication protocols in wireless communication networks, such as cellular networks. The terms "packet," "packet-based," and their variants refer to protocols or the use of protocols in which communications are divided into packets (which may be referred to using other terms such as datagrams, frames and cells) before being sent to a destination. Each packet is then communicated individually to the destination and may follow different communication paths to the destination. Packet-based communication protocols may include, but are not limited to, IP, ATM, Frame Relay, and X.25 communication protocols. Due to the convergence of voice and data services, traditional circuit-switched communications, such as telephone calls, are gradually becoming packet-based communications. For example, telephone calls may now be made over IP and other packet-based networks using technologies such as Voice over IP (VoIP).

In addition to IP base station 22 and GPRS network 26, mobile stations 20 also may be coupled to a WLAN access point 30. Access point 30 is coupled to a WLAN (such as IP network 24) and allows mobile station 20 to communicate with other devices coupled to the WLAN. Furthermore, mobile station 20 may also be wirelessly coupled to one or more satellites 32 to enable communication with one or more devices coupled to IP network 24, PSTN 28, or any other appropriate networks. In addition, mobile station may communicate with devices coupled to IP network 24 using a Digital Subscriber Line (DSL) modem 34 or a Data Over Cable Service Interface Specification (DOCSIS) modem 36. DSL modem 34 and DOCSIS modem 36 may be coupled to IP network 24 using an ATM network 38 and a cable data network 40, respectively, or using any other appropriate techniques. Mobile station 20 may also communicate directly with other devices, such as other mobile stations 20, using infrared (IR) communication links, short-range radio links (for example, using Bluetooth technology), or any other suitable wireless communication techniques. Moreover, mobile station may be physically connected to any appropriate device 42 using a RS-232 port or any another suitable wireline connection.

As with heterogeneous handoffs between the different cellular systems described above, handoffs between the other wireless and wireline technologies illustrated in FIG. 2 (or between these other wireless and wireline technologies and one or more of the cellular systems), when available, may also result in noticeable degradation or interruption of an ongoing communication session if the handoff is controlled by devices associated with the various technologies. Moreover, heterogeneous handoffs between particular networks or devices may not be possible if the devices or networks are not capable of communicating with one another to transfer an ongoing communication from one network or stand-alone device to another.

These problems associated with heterogeneous handoffs between diverse technologies are caused (at least in part) because the handoff has typically not been controlled by mobile station 20, but with selected devices in the various networks (for example, MSCs 12 and controllers 16 in network 10, routers in a WLAN, or other similar devices). However, since each of these diverse technologies uses different communication and signaling techniques and may not be able to communicate with other technologies, it is difficult (and sometimes infeasible or impossible) to provide handoff of communications from one technology to another. Furthermore, as the communication links with mobile stations 20 become increasingly packet-based, the concept of traditional handoffs is becoming increasingly obsolete. One solution to these problem is to move "handoff" control (including packet-by-packet routing decisions when packet-based links are used) from the various network devices to a single location—the mobile station 20.

Figure 3:
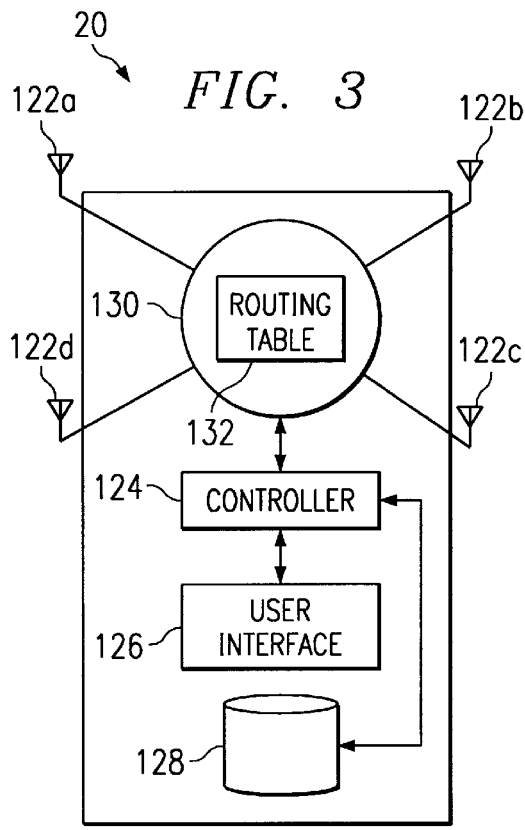
FIG. 3 illustrates an exemplary mobile station capable of selecting and communicating with one or more communication networks or stand-alone devices and capable of controlling routing of communications with such networks and stand-alone devices.

FIG. 3 illustrates an exemplary mobile station 20 capable of selecting and communicating with one or more communication networks or stand-alone devices and controlling routing of the communications with such networks and stand-alone devices. The term "routing," and its variants, is used to encompass traditional circuit-switched handoffs as well as routing of individual packets using packet-based communication links. The functional components of mobile station 20 may include one or more interfaces 122 for enabling communication with networks and stand-alone devices, a controller 124, one or more user interfaces 126, a memory 128, and a router 130. Mobile station 20 may also include any other appropriate components, including but not limited to, a power source, an amplifier, one or more digital signal processors (DSPs), and an analog-to-digital/digital-to-analog converter. The operation and function of such components, as well as their interaction with the components described below is well known in the art and is not discussed in this description.

In general, mobile station 20 supports data communications sessions with one or more devices coupled to mobile station 20 using one or more wireless or wireline communication links. Mobile station 20 may include an interface 122 for each different type of communication link. Each interface 122 couples mobile station 20 to one or more stand-alone devices or networks using an appropriate type of communication link. As an example only and not by way of limitation, mobile station 20 may include an interface 122*a* for communicating with a TDMA network, an interface 122*b* for communicating with a CDMA network, an interface 122*c* for communicating with a IP WLAN, and an interface 122*d* for communicating with one or more Bluetooth devices. Any appropriate number and type of interfaces 122 may be included. Furthermore, interfaces 122 may be implemented as any suitable combination of hardware and/or software. As an example only, an interface 122 may include an antenna and a transceiver for transmitting and receiving wireless signals to and from a network or stand-alone device. Furthermore, multiple transceivers may share a single antenna.

Controller 124 manages the operation of components in mobile station 20. For example, controller 124 may be a processor that executes software stored in memory 128, receives input from one or more user interfaces 126 for use in executing the software, and communicates output of the software to a user of mobile station 20 using one or more user interfaces 126. Memory 128 may store software applications (including firmware) for providing wireless and/or wireline communications services, as well as other features and functions, to a user of mobile station 20. Controller 124, user interfaces 126, and memory 128 may be implemented as any suitable combination of hardware and/or software. As an example only, mobile station 20 may include a touch screen that serves as both a user input and output interface 126. Controller 124 may execute web browsing software stored in memory 128 which allows user to communicate with one or more web servers coupled to an IP network 24 using user interface 126. Furthermore, mobile station 20 may include a microphone and speaker as user interfaces 126 that allow a user of mobile station to place a telephone call (for example, a packet-based or circuit-switched call) to one or more devices to which mobile station 20 is coupled. Controller 124 may establish and/or control such calls using appropriate software stored in memory 128. Any other appropriate implementations of controller 124, user interfaces 126, and memory 128 may be used instead of or in addition to the exemplary implementations described above and are included within the scope of the present invention.

In addition to the components described above, mobile station 20 also includes one or more routers 130. Unlike traditional mobile stations, router 130 provides mobile station 20 with the ability to manage and control the communication links used to communicate information to and from mobile station 20. One facet of such control is the ability to direct the initiation of a communication session with a particular network or stand-alone device and the handoff of the communication session from one or more networks or stand-alone devices to any other. Router 130 enables mobile station 20 to determine characteristics of the various available communication links and to choose, at any given instant, which communication link or links to use for a communication.

Router 130 may be implemented as any appropriate combination of hardware and/or software and may route communications having any suitable format. Router 130 (or associated hardware and/or software components) may also convert communications into an appropriate format for transmission over a communication link or for processing at mobile station 20. Furthermore, although the term "router" is used, router 130 may be used to direct communications at any "layer" in a packet-based network and router 130 may also be used to direct communications to and from a circuit-switched network. In the future, virtually all communication networks will optimally be implemented as or evolve into IP or other packet-based networks so that router 130 may seamlessly route and receive packets to and from the various networks and stand-alone devices.

In operation, mobile station 20 may continuously or intermittently monitor the availability and quality of the various communication links available to mobile station 20 using interfaces 122. For example, mobile station 20 may continuously or intermittently determine the availability of a TDMA communication link with interface 122*a*, the availability of a CDMA communication link with interface 122*b*, and likewise for the other interfaces 122. Controller 124, router 130, or any other appropriate components of mobile station 20 may be used to direct interfaces 122 to connect with the appropriate networks or stand-alone devices and may evaluate signals received from such networks or stand-alone devices (or the lack thereof) to determine the availability of a communication link. For example, router 130 or controller 124 may initiate the establishment of control channels with the various networks and stand-alone devices to determine whether a communication link with each of the networks and stand-alone devices is available.

At any given moment, the available communication links determined by mobile station 20 and the network topological information obtained from routers in the various networks coupled to mobile station 20 forms an "instantaneous internetwork" topology. The internetwork topology (from the view of mobile station 20) is the specific physical and/or logical arrangement of the devices in the networks coupled to mobile station 20 at a particular moment. The internetwork topology may also include any stand-alone devices coupled to mobile station 20. The internetwork topology will change as the available communication links with mobile station 20 change and as other changes occur in the various networks coupled to mobile station 20. Router 130 uses this topology information along with one or more metrics to determine the optimal path over which communications between mobile station 20 and a destination device should be routed. Router 130 then switches the corresponding packets or other communications to one or more appropriate interfaces 122 for communication over the appropriate communication path to the destination device(s).

To aid the process of path determination, router 130 uses routing algorithms to build and maintain one or more routing tables 132, which contain route information. The route information varies depending on the type of routing algorithm used and is developed using routing metrics. Router 130 may use any appropriate routing mechanism or mechanisms. Routing table 132 may include destination/next hop associations that identify a particular router representing the "next hop" on the optimal path to a particular destination. When router 130 receives an incoming packet or other communication to be communicated from mobile station 120, router 130 checks the destination address and attempts to associate this address with a next hop. Routing table 132 may also include other information, such as data about the desirability of a path. Furthermore, source routing may be supported.

In addition to building routing table 132 using metrics known by router 130, router 130 also communicates with other routers to update routing table 132 and the routing tables of other routers. For example, router 130 may communicate all or a portion of routing table 132 to other routers and receive routing table information from other routers. Router 130 may also send and receive link information identifying the state of the links to a particular router. Link information can be used to build a complete picture of the internetwork topology to enable routers in the internetwork, including router 130, to determine optimal routes to network destinations. The information about the availability of links to mobile routers, such as router 130, is important since the communication links to such routers change much more frequently than with fixed routers. The use of routing algorithms and routing tables is well-known in the art and will not be described in further detail.

As mentioned above, router 130 uses one or more metrics when routing packets or other communications. A metric is a standard of measurement that is used by routing algorithms to determine the optimal path to a destination. Routing algorithms may use many different metrics to determine the optimal path. Sophisticated routing algorithms base route selection on multiple metrics, combining them in a single hybrid metric. Examples of traditional metrics that have been used are path length, reliability, latency, bandwidth, load, and communication cost. Path length is the most common routing metric. In some instances, path length may be based on the sum of a "cost" associated with each network link that is included in a particular path. The "cost" of a particular link is typically assigned by a network administrator. Other routing protocols define path length as the number of routers or other internetworking devices through which a packet must travel en route from a source to a destination. This is typically referred to as a "hop count."

Reliability refers to the historical dependability of each network link. Some network links might go down more often than others and certain network links might be repaired more easily or more quickly than other links when they do go down. Based on these and other appropriate reliability factors, each communication link may be assigned a reliability rating by a network administrator or other similar entity. Latency refers to the length of time required to move a packet or other communication from source to destination. Latency depends on many factors, including the bandwidth of intermediate network links, the port queues at each router along the route, network congestion on all intermediate network links, and the physical distance to be traveled.

Bandwidth refers to the available traffic capacity of a link. Although bandwidth is a rating of the maximum attainable throughput of a link, routes through links with greater bandwidth do not necessarily provide better routes than routes through slower links. If, for example, a faster link is busier, the actual time required to send a packet to the destination could be greater. Load refers to the degree to which a network resource, such as a router, is busy. Load can be calculated in a variety of ways, including CPU utilization and packets processed per second. Communication cost may also be used as a metric since many businesses may not care more about operating expenditures than they do about performance. For example, even though latency may be longer, an entity may choose to configure their routers to send packets over their own lines rather than through the public lines that cost money for usage time.

In addition to these traditional routing metrics, router 130 also uses another metric that takes into consideration the fact that the majority of the communication links with mobile station 130 are wireless links. This metric is the link quality of the communication links. Link quality in wireline links is typically not a significant factor, so traditional routers typically do not include link quality as a routing metric. However, link quality is a factor with wireless links. Some types of wireless links may always have a higher link quality than others. Furthermore, the link quality of a given communication link may vary over time. For example, as mobile station 20 moves away from an IP base station 22, the link quality of the link with base station 22 will decrease (until communication with base station 22 is no longer possible). Therefore, in choosing a path over which packets and other communications should be communicated to and from mobile station 20, the quality of the various communication links with mobile station 20 should be evaluated.

One traditional measure of the quality of a communication link is bit error rate (BER). The BER is the percentage of bits that have errors relative to the total number of bits received in a transmission. The BER is an indication of how often a packet or other data unit has to be retransmitted because of an error. Another measure of link quality that may be used is Received Signal Strength Indication (RSSI), which is well known in the art of mobile communications. Furthermore, any other appropriate measures of link quality may alternatively be used. BER, RSSI, and such other measures will be collectively referred to as link quality indicators and the process of determining these indicators will be referred to as link quality measurements.

Mobile station 20 may include hardware and/or software for performing link quality measurements to produce link quality indicators for use as routing metrics. Such hardware and/or software may be included in or separate from interfaces 122, controller 124, memory 126, and/or router 130. For the purposes of this description and the following claims, router 130 will be described as performing link quality measurements and periodically determining the link quality of existing links for use as a routing metric. However, it should be understood that these functions may be performed by any suitable component or components of mobile station 20 and such components may provide link quality information to router 130 for use as a routing metric or for re-routing communications, as described below.

Link quality may be used as the only metric or it may be used in combination with other metrics to determine the optimal path. In addition to link quality, the power required to a maintain wireless link may also be included as a routing metric. The power requirements of the various possible communication links are typically not used as a metric since devices in wireline network are typically powered using AC outlets and since power requirements for most wireline communications links are similar. However, mobile station 20 may typically be powered using a battery or other limited source of power. In addition, the various wireless communications links with mobile station 20 may require varying amounts of power to maintain a connection and to communicate information. Therefore, router 130 may also use the power requirements of the possible communication links as a routing metric.

Figure 4:
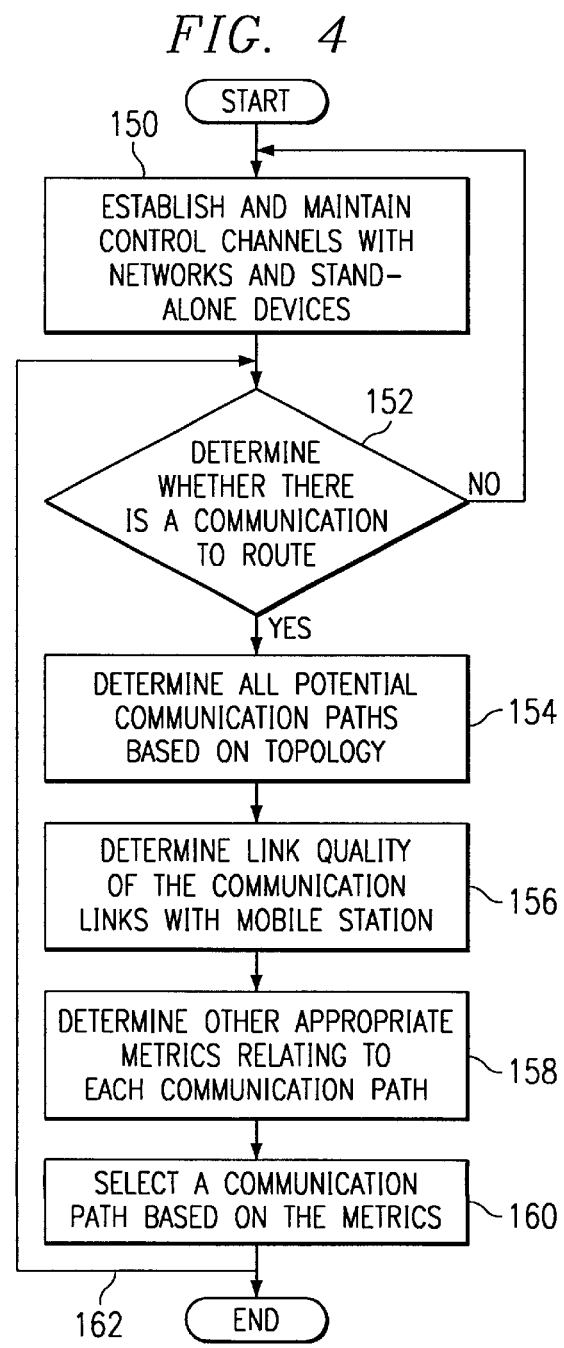
FIG. 4 illustrates an exemplary method for routing communications to and from a mobile station.

FIG. 4 illustrates an exemplary method for routing communications to and from mobile station 130. The method begins at step 150 at which mobile station 20 attempts to establish and maintain a control channel using each interface 122 to determine if each interface is able to communicate with a corresponding network or stand-alone device. The term "control channel" should be understood to include any appropriate communication or attempted communication with a device to determine the existence and/or availability of a communication link with the device. As an example only and not by way of limitation, interface 122a may attempt to establish a control channel with one or more base stations 18 in a TDMA network, an interface 122b may attempt to establish a control channel with one or more base stations 18 in a CDMA network, interface 122c may attempt to establish a control channel with a access point 30 to an IP WLAN, and an interface 122d may attempt to establish a control channel with one or more Bluetooth devices.

At step 152, router 130 determines whether there is a communication to route. This may include determining that one or more IP or other packets are ready to be communicated to a particular destination, that a user of mobile station 20 desires to place a circuit-switched telephone call to a particular destination, or any other appropriate determination. If there is not a communication to route, then the method returns to step 150 and mobile station 20 continues to attempt to establish and maintain control channels using interfaces 122. If there is a communication to route, then the method proceeds to step 154. At step 154, router 130 determines all potential communication paths over which the packets or other communications may be sent to the particular destination.

Communication paths are the unique combinations of one or more communication links that couple mobile station 20 to an intermediate or final destination of a communication. As an example only, a communication path may include a wireless communication link between mobile station 20 and an IP WLAN access point 30, a wireline communication link between access point 30 and a router in the WLAN, and a wireline communication link between the router and a destination device. Another exemplary communication path may include a wireless communication link between mobile station 20 and an IP base station 22 in a CDMA, TDMA, or other cellular network, a wireline link between IP base station 22 and an IP network 24, a wireline link between IP network 24 and second IP base station 22, and a wireless link between the second IP base station 22 and a second mobile station 20. Yet another exemplary communication path may include the wireless communication link between mobile station 20 and a non-IP base station 18 in a CDMA, TDMA, or other cellular network. Although the actual communication path to a destination may include other communication links (such as wireline links between a controller 16, a MSC 12, and PSTN 28), the communication path that router 130 has topology and metric information for may only include the wireless link with mobile station 20. In such a case, router 130 may make routing decisions based on information about the single communication link (router 130 considers the base station 18 to be the destination and thus the single communication link is the communication path). Furthermore, numerous other types of communication paths including numerous other types of communication links may be available to and evaluated by router 130.

The determination of the available communication paths is based on the topology of the internetwork formed by the various networks and stand-alone devices coupled to mobile station 20 using interfaces 122. Router 130 determines the topology based on information about the current communication links with mobile station 20 (which may be obtained from another component or components of mobile station 20, if appropriate) and about the individual topologies of the networks coupled to mobile station 20 using the communication links (which may be obtained from communication with routers or other devices in these networks). For example, router 130 may obtain routing tables or portions of routing tables from other routers in the internetwork. Router 130 may also communicate routing table 132 to one or more of these other routers to identify potential communication paths from the destination to mobile station 20.

At step 156, router 130 determines the link quality of one or more of the communication links with mobile station 20 that are included in the communication paths that were determined to be available in step 154. As an example only, router 130 may determine the link quality of the wireless communication link between mobile station 20 and an IP base station 22 and/or a non-IP base station 18, between mobile station 20 and a Bluetooth device (such as another mobile station 20), and between mobile station 20 and a WLAN access point 30. Each of these exemplary communication links may be part of (or all of) one or more communication paths to a destination. Router 130 may make link quality determinations based on any appropriate measurements of link quality performed by router 130, controller 124, or any other suitable component or components of mobile station 20. The measurement of the link quality of the communication links may occur immediately before the selection of a communication path for a particular communication (described below) so that the link quality information is as accurate as possible.

In addition to determining link quality, router 130 may also determine at step 158 other appropriate metrics relating to the potential communication paths, as described above. These metrics may be measured by router 130, measured by other devices and communicated to router 130, defined by network administrators or similar personnel and communicated to router 130, or may be obtained by router 130 using any other suitable techniques.

Router 130 selects one or more of the potential communication paths based on one or more of these metrics at step 160. Router 130 may give each metric any suitable weight with respect to other metrics and may use any appropriate metric or combination of metrics. Techniques for determining an optimal communication path based on metrics using a variety of different routing algorithms are well-known in the art and are not described in further detail. Any appropriate routing algorithm may be used. After router 130 selects a communication path at step 160, the method may return to step 152 for continued routing of communications (as indicated by arrow 162) or the method may end.

For packet-based communications or other communications in which the communication load may be split between communication paths (traffic shaping), router 130 may select multiple communication paths over which to communicate packets or similar communications. For packet-based communications, router 130 may select a communication path for each packet or router 130 may select a communication path for the first packet to a particular destination and then send subsequent packets to that destination over the same communication path without re-determining the optimal communication path based on the available metrics. Since the quality and/or existence of communication links with mobile station 10 may change, router 130 may also periodically re-determine the optimal communication path to a particular destination if router 130 does not make such a determination on a packet-by-packet basis. Routing of circuit-switch communications may be made on a per-call basis if the communication is a telephone call or other communication having defined beginning and end points. Circuit-switched communications may also be periodically re-routed (assuming the available metrics indicate that another communication path is optimal) on a periodic basis or based on changes in one or more metrics. Circuit-switched communications may also be transferred to packet-based communication paths, as well as the opposite.

In addition to or instead of being used as a metric to determine an optimal communication path or paths, the link quality of a particular communication link in a communication path may be monitored to determine when a particular communication link with mobile station 20 (typically a wireless link) is exhibiting decreasing link quality and to indicate the need to establish a different communication path before the decreasing link quality impairs or prevents communications. In short, link quality may be used to accomplish a transparent re-routing or "handoff" of communications such that the communications continue uninterrupted as the communication links with mobile station 20 increase and decrease in quality (for example, as mobile station 20 moves towards or away from devices used to provide various wireless communication links). Although link quality may be used in this manner in conjunction with wireline communication links with mobile station 20, such monitoring of link quality to determine when to establish alternative communication paths is especially useful for wireless links, which are typically established on an as-needed basis (unlike permanent wireline connections).

FIG. 5 illustrates an exemplary method for re-routing communications based on link quality. The method begins at step 180 at which one or more components of mobile station 20 are used to monitor the link quality of a primary communication link. The primary communication link is the direct communication link with mobile station 20 that is included in a communication path that router 130 has selected for a particular communication. For example, if router selects a communication path through a WLAN, the primary communication link may be the wireless connection between mobile station 20 and a WLAN access point 30. Router 130 receives this link quality information and compares the link quality of the primary communication link to a high link quality threshold and a low link quality threshold, described below. This comparison may be performed periodically at any appropriate time intervals and the link quality information may be updated accordingly. The thresholds may be expressed in terms of bit error rates or any other suitable measure of link quality and may be set an any appropriate levels.

Router 130 determines at step 182 whether the link quality of the primary communication link is below the high link quality threshold. If the link quality is above the high link quality threshold, then method returns to step 180. If the link quality is below the high link quality threshold, router 130 establishes (or initiates the establishment of) one or more alternative communication links at step 184. An alternative communication link is a direct communication link with mobile station 20 (other than the primary communication link) that is included in an alternative communication path that router 130 has selected. Router 130 may select alternative communication paths using metrics as described above, however, router 130 may be limited to choosing a path that does not include the primary communication link (although router 130 may choose a path that includes the same type of link). As an example only, the primary communication may be a link with a access point to a WLAN and the alternative communication link may be a link with an IP base station 22 or a non-IP base station 18. Although the alternative communication link with mobile station 20 is different than the primary communication link with mobile station 20, the alternative communication path may have other links in common with the primary communication path.

At step 186, router 130 may begin transmitting substantially identical or "redundant" communications from mobile station 20 over the primary and alternative communication links. Either the destination device or an intermediate device in a network, such as a router, may determine which of the redundant communications to use. Alternatively, router 130 may route different portions of the communications from mobile station 20 over the primary and alternative communication links. For example, router 130 may split the communication load between the links.

Router 130 determines at step 188 whether the link quality of the primary communication link has decreased below the low link quality threshold. If the link quality is not below the low link quality threshold, then a determination is made at step 190 as to whether the link quality is still below the high link quality threshold. If the link quality is still below the high link quality threshold, then the method returns to step 186. If the link quality has increased above the high link quality threshold, then the alternative communication links are abandoned at step 192 and the method returns to step 180, as indicated by arrow 194.

If router 130 determines at step 188 that the link quality has decreased below the low link quality threshold, router 130 selects one or more of the alternative communication links to become the primary communication link (and the communication path of which the alternative link is a part to become the primary communication path) at step 196. At step 198, the previous primary communication link and any unselected alternative communication links are abandoned (so there is typically no further redundant routing). The method may then return to step 180 (as indicated by arrow 200) so that the new primary communication link can be monitored or the method may end. The method may be performed for each destination address with which mobile station 20 is communicating (for each communication session).

Using the exemplary methods described, communications to and from a mobile station 20 may be routed based, at least in part, on the quality of the various communication links available at mobile station 20. Unlike devices having a fixed location, the availability and quality of communication links with mobile station 20 may often change. The present invention accounts for the effect of this changing environment when routing communications to and from mobile station 20. The present invention also provides transparent routing of communications between different communication links as the link quality of the communication link currently being used decreases. Furthermore, such transparent re-routing or "handoff" is provided between diverse communication networks and technologies.

As an example only and not by way of limitation, a user of a first mobile station 20 may begin a telephone call (either circuit-switched or packet-based) with a second mobile station 20. The call may initially be routed from first mobile station 20 to an access point 30 of a WLAN in the user's home. A communication path using the WLAN may be chosen based on cost-savings associated with using the WLAN (versus a cellular connection, for instance), the high link quality of the wireless communication link to the WLAN, or based on any other metric or combination of metrics. The WLAN may be coupled to the Internet or another WAN, and the Internet or WAN may be coupled to an IP base station 22 in communication with the second mobile station 20. Therefore, the call may be routed between the mobile stations 20 using the WLAN, the WAN, and the IP base station 22.

If the user begins to move out of the range of the WLAN, the first mobile station 20 may establish an alternative connection with a base station 18 using a GPRS connection (for example, when the link quality of the WLAN link decreases below the high threshold). First mobile station 20 then performs a transparent re-routing or handoff of the call between the WLAN and base station 18 as the WLAN communication link fades (for example, when the link quality of the WLAN link decreases below the low threshold). The call may now be routed to the WAN and to IP base station using a GPRS network 26 coupled to base station 18 (or a controller 16 of base station 18). Finally, although the link quality of the base station link with first mobile station 20 may be strong, mobile station 20 may determine the existence of a Bluetooth connection with second mobile station 20 due to the movement of the mobile stations 20 within proximity of one another. Based on a path length metric (or any other appropriate metric or metrics), first mobile station 20 may determine that the call should be routed directly to the second mobile station 20 using the Bluetooth link.

As can be seen from this example, a call or other communication may be routed using a variety of different communication links available at a mobile station 20 and such communication links may be chosen based on a number of different metrics. Furthermore, a communication can be transparently re-routed between the different communication links as the link quality of the communication links changes. Moreover, although the description above has focused on routing of communications in which mobile station 20 is a participant, router 130 in mobile station 130 may also be used to route communications between other devices. Therefore, mobile stations 20 incorporating features described above may form a dynamic network that may be used to route communications in much the same way that the fixed routers of the Internet are used today.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for re-routing communications based on link quality, comprising:

establishing a first wireless communication link and a second wireless communication link with a mobile station, the first wireless communication link included in a first communication path used for communications between the mobile station and a destination device, the second wireless communication link included in a second communication path used for communications between the mobile station and the destination device;

monitoring, from the mobile station, the link quality of the first wireless link;

determining, at the mobile station, that the link quality of the first communication link has decreased below a low link quality threshold;

using a router at the mobile station, routing communications between the mobile station and the destination device to the second communication path that includes the second wireless communication link to the mobile station, the second communication path selected by the router based on an instantaneous internetwork topology and one or more routing metrics;

determining, at the mobile station, that the link quality of the first communication link has decreased below a high link quality threshold that is higher than the low link quality threshold;

establishing the second wireless communication link included in the second communication path; and routing communications between the mobile station and the destination device to both the first and second communication paths.

2. The method of claim 1, wherein routing communications comprises transmitting the communications to a communication interface of the mobile station associated with the second wireless communication link.

3. The method of claim 1, wherein routing communications comprises communicating routing information associated with the second communication path to one or more routers coupling the mobile station and the destination device.

4. The method of claim 1, further comprising abandoning the first wireless communication link after initiating routing of the communications to the second communication path.

5. The method of claim 1, wherein the first and second communication links use different wireless communication protocols.

6. The method of claim 5, wherein at least one of the wireless communication protocols is not a cellular telephone communication protocol.

7. The method of claim 1, wherein both the first and second communication links support packet-based communications.

8. The method of claim 1, wherein the first communication link supports packet-based communications and the second communication link supports circuit-switched communications.

9. The method of claim 1, wherein monitoring the link quality of the first wireless communication link comprises measuring the bit error rate of the wireless communication link.

10. The method of claim 1, further comprising abandoning the first communication link after the link quality of the first communication link has decreased below the low link quality threshold.

11. The method of claim 1, wherein routing communications using both the first and second communication paths comprises routing substantially identical communications over the first and second communication paths.

12. The method of claim 1, wherein routing communications using both the first and second communication paths comprises routing different portions of the communications using the first and second communication paths.

13. A mobile station, comprising:

a first communication interface operable to enable a first wireless communication link with the mobile station, the first wireless communication link included in a first communication path used for communications between the mobile station and a destination device;

a second communication interface operable to enable a second wireless communication link with the mobile station, the second wireless communication link included in a second communication path used for communications between the mobile station and the destination device; and a router operable to:

monitor the link quality of the first wireless link;

determine that the link quality of the first communication link has decreased below a low link quality threshold;

route communications between the mobile station and the destination device to the second communication path that includes the second wireless communication link with the mobile station, the second wireless communication link enabled using the second communication interface, the second communication path selected by the router based on an instantaneous internetwork topology and one or more routing metrics;

determine that the link quality of the first communication link has decreased below a high link quality threshold that is higher than the low link quality threshold;

initiate the establishment of the second wireless communication link included in the second communication path; and route communications between the mobile station and the destination device to both the first and second communication paths.

14. The mobile station of claim 13, wherein routing communications comprises transmitting the communications to the second communication interface.

15. The mobile station of claim 13, wherein routing communications comprises communicating routing information associated with the second communication path to one or more routers coupling the mobile station and the destination device.

16. The mobile station of claim 13, wherein the router is further operable to initiate the abandonment of the first wireless communication link after initiating routing of the communications to the second communication path.

17. The mobile station of claim 13, wherein the first and second communication interfaces use different wireless communication protocols.

18. The mobile station of claim 17, wherein at least one of the wireless communication protocols is not a cellular telephone communication protocol.

19. The mobile station of claim 13, wherein both the first and second communication links support packet-based communications.

20. The mobile station of claim 13, wherein the first communication link supports packet-based communications and the second communication link supports circuit-switched communications.

21. The mobile station of claim 13, wherein the router is further operable to determine the bit error rate of the wireless communication link to monitor the link quality.

22. The mobile station of claim 13, wherein the router is further operable to initiate the abandonment of the first communication path after the link quality of the first communication link has decreased below the low link quality threshold.

23. The mobile station of claim 13, wherein routing communications using both the first and second communication paths comprises routing substantially identical communications over the first and second communication paths.

24. The mobile station of claim 13, wherein routing communications using both the first and second communication paths comprises routing different portions of the communications using the first and second communication paths.

25. Communication software embodied in a computer-readable medium and operable to:

establish a first wireless communication link and a second wireless communication link with a mobile station, the first wireless communication link included in a first communication path used for communications between the mobile station and a destination device, the second wireless communication link included in a second communication path used for communications between the mobile station and the destination device;

monitor, from the mobile station, the link quality of the first wireless link;

determine, at the mobile station, that the link quality of the first communication link has decreased below a low link quality threshold;

route communications between the mobile station and the destination device the second communication path that includes the second wireless communication link to the mobile station, the second communication path selected by the router based on an instantaneous inter-network topology and one or more routing metrics;

determine, at the mobile station, that the link quality of the first communication link has decreased below a high link quality threshold that is higher than the low link quality threshold;

establish the second wireless communication link included in the second communication path; and route communications between the mobile station and the destination device to both the first and second communication paths.

26. The software of claim 25, wherein routing communications comprises transmitting the communications to a communication interface of the mobile station associated with the second wireless communication link.

27. The software of claim 25, wherein routing communications comprises communicating routing information associated with the second communication path to one or more routers coupling the mobile station and the destination device.

28. The software of claim 25, further operable to abandon the first wireless communication link after initiating routing of the communications to the second communication path.

29. The software of claim 25, wherein the first and second communication links use different wireless communication protocols.

30. The software of claim 29, wherein at least one of the wireless communication protocols is not a cellular telephone communication protocol.

31. The software of claim 25, wherein both the first and second communication links support packet-based communications.

32. The software of claim 25, wherein the first communication link supports packet-based communications and the second communication link supports circuit-switched communications.

33. The software of claim 25, wherein monitoring the link quality of the first wireless communication link comprises measuring the bit error rate of the wireless communication link.

34. The software of claim 25, further operable to abandon the first communication link after the link quality of the first communication link has decreased below the low link quality threshold.

35. The software of claim 25, wherein routing communications using both the first and second communication paths comprises routing substantially identical communications over the first and second communication paths.

36. The software of claim 25, wherein routing communications using both the first and second communication paths comprises routing different portions of the communications using the first and second communication paths.

37. A system for re-routing communications based on link quality, comprising:

means for establishing a first wireless communication link and a second wireless communication link with a mobile station, the first wireless communication link included in a first communication path used for communications between the mobile station and a destination device, the second wireless communication link included in a second communication path used for communications between the mobile station and the destination device;

means for monitoring, from the mobile station, the link quality of the first wireless link;

means for determining, at the mobile station, that the link quality of the first communication link has decreased below a low link quality threshold;

means for routing communications between the mobile station and the destination device to the second communication path that includes the second wireless communication link to the mobile station, the second communication path selected based on an instantaneous internetwork topology and one or more routing metrics;

means for determining, at the mobile station, that the link quality of the first communication link has decreased below a high link quality threshold that is higher than the low link quality threshold;

means for establishing the second wireless communication link included in the second communication path; and means for routing communications between the mobile station and the destination device to both the first and second communication paths.

* * * * *